US012555350B2

(12) United States Patent
Olsen et al.

(10) Patent No.: US 12,555,350 B2
(45) Date of Patent: Feb. 17, 2026

(54) CLOUD REMOVAL BY ILLUMINATION NORMALIZATION AND INTERPOLATION WEIGHTED BY CLOUD PROBABILITIES

(71) Applicant: MICROSOFT TECHNOLOGY LICENSING, LLC, Redmond, WA (US)

(72) Inventors: Peder Andreas Olsen, Cortlandt Manor, NY (US); Roberto De Moura Estevao Filho, Rio de Janeiro (BR); Leonardo de Oliveira Nunes, Rio de Janiero (BR)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 404 days.

(21) Appl. No.: 18/181,183

(22) Filed: Mar. 9, 2023

(65) Prior Publication Data
US 2024/0119700 A1  Apr. 11, 2024

Related U.S. Application Data

(60) Provisional application No. 63/413,947, filed on Oct. 6, 2022.

(51) Int. Cl.
| | |
|---|---|
| G06V 10/60 | (2022.01) |
| G06T 7/90 | (2017.01) |
| G06V 10/25 | (2022.01) |
| G06V 10/26 | (2022.01) |
| G06V 10/56 | (2022.01) |
| G06V 10/74 | (2022.01) |
| G06V 20/13 | (2022.01) |

(52) U.S. Cl.
CPC .............. *G06V 10/60* (2022.01); *G06T 7/90* (2017.01); *G06V 10/25* (2022.01); *G06V 10/26* (2022.01);
(Continued)

(58) Field of Classification Search
CPC ........ G06V 10/60; G06V 10/30; G06V 10/25; G06V 10/26; G06V 10/56; G06V 10/74;
(Continued)

(56) References Cited

U.S. PATENT DOCUMENTS

2021/0133936 A1* 5/2021 Chandra ................. G06T 5/50

OTHER PUBLICATIONS

Hogland, et al., "Estimating Forest Characteristics for Longleaf Pine Restoration Using Normalized Remotely Sensed Imagery in Florida USA", In Journal of Forests, vol. 11, Issue 4, Apr. 9, 2020, 21 Pages.

(Continued)

*Primary Examiner* — Duy M Dang
(74) *Attorney, Agent, or Firm* — David Foster; Newport IP, LLC

(57) ABSTRACT

Clouds in a satellite image are replaced with a prediction of what was occluded by those clouds. The cloudy portion of the image is interpolated from a series of satellite images taken over time, some of which are cloud-free in the target image's cloudy portion. In some configurations, clouds are removed taking into account each pixel's availability—a measure of certainty that a pixel is cloud-free. Furthermore, these images may have been taken under different amounts of illumination, making it difficult to determine whether a difference between two images is due to a change in illumination or a change to the location. The effect of illumination on each image is removed before interpolating the cloudy portion of the image. In some configurations, removing the effect of illumination also takes into account pixel availability.

20 Claims, 6 Drawing Sheets

(52) U.S. Cl.
CPC ............ *G06V 10/56* (2022.01); *G06V 10/761* (2022.01); *G06V 20/13* (2022.01); *G06T 2207/10024* (2013.01)

(58) Field of Classification Search
CPC ........ G06V 10/761; G06V 20/13; G06T 7/90; G06T 2207/10024; G06T 2207/10032; G06T 2207/30192; G06T 5/77; G06T 5/50

See application file for complete search history.

(56) References Cited

OTHER PUBLICATIONS

Zhao, et al., "Seeing Through Clouds in Satellite Images", In repository of arXiv:2106.08408v1, Jun. 15, 2021, 28 Pages.

Adam et al., "Cloud Removal in High Resolution Multispectral Satellite Imagery: Comparing Three Approaches," The 2nd International Electronic Conference on Remote Sensing, vol. 2, XP093110132, Jan. 1, 2018, 6 pages.

International Search Report and Written Opinion received for PCT Application No. PCT/US2023/032566 (MS# 412334-PCT01), mailed on Dec. 22, 2023, 12 pages.

Wang et al., "Automated Detection and Removal of Clouds and Their Shadows from Landsat TM Images", IEICE Transactions on Information and Systems, XP093110845, Feb. 2, 1999, pp. 453-460.

Wang et al., "Removing Clouds and Recovering Ground Observations in Satellite Image Sequences via Temporally Contiguous Robust Matrix Completion," IEEE Conference on Computer Vision and Pattern Recognition (CVPR), XP033021455, Jun. 27, 2016, pp. 2754-2763.

International Preliminary Report on Patentability received for PCT Application No. PCT/US23/032566 (MS# 412334-PCT01), mailed on Apr. 17, 2025, 09 pages.

* cited by examiner

CLOUD REMOVAL BY ILLUMINATION NORMALIZATION AND INTERPOLATION WEIGHTED BY CLOUD PROBABILITIES

PRIORITY APPLICATION

This application claims the benefit of and priority to U.S. Provisional Application No. 63/413,947, filed Oct. 6, 2022, the entire contents of which are incorporated herein by reference.

BACKGROUND

Satellite images often contain clouds that obscure the ground below. This interferes with many applications of satellite imagery such as analyzing crop growth or performing an environmental survey. However, replacing clouds in satellite images with a prediction of what they obscure has proven challenging.

Previous techniques for removing clouds from images have utilized radar-based images in addition to images that capture visual or near-visual wavelengths of light. Radar-based images have proven useful on very cloudy days. However, using radar-based images increases cost, and in some cases a radar-based image may not be available at any price.

In addition to obscuring the underlying landscape, clouds affect the level of illumination in an image. For example, a satellite image that's taken on a clear day will be much brighter than one that's taken on a cloudy day. Other factors affect illumination, such as the position of the sun in the sky. For example, when the sun is lower on the horizon the image will be darker. Different levels of illumination may make an identical scene appear differently—i.e., one image taken under one level of illumination will be different than another image of the same location that was taken under a different level of illumination.

For example, a series of satellite images of a particular location may be taken over the course of days or weeks. Different images may have different levels of illumination. As such, color changes caused by changes in the scene itself, such as a gradual greening of a field, are confounded by color changes caused by different levels of illumination. This confounding makes it difficult to isolate changes in the scene itself when predicting what lies beneath a cloud.

It is with respect to these and other considerations that the disclosure made herein is presented.

SUMMARY

In some configurations, clouds in a satellite image are replaced with a prediction of what was occluded by those clouds. The cloudy portion of the image is interpolated from a series of satellite images taken over time, some of which are cloud-free in the target image's cloudy portion. In some configurations, clouds are removed taking into account each pixel's availability—a measure of certainty that a pixel is cloud-free. Furthermore, these images may have been taken under different amounts of illumination, making it difficult to determine whether a difference between two images is due to a change in illumination or a change to the location. The effect of illumination on each image is removed before interpolating the cloudy portion of the image. In some configurations, removing the effect of illumination also takes into account pixel availability.

Features and technical benefits other than those explicitly described above will be apparent from a reading of the following Detailed Description and a review of the associated drawings. This Summary is provided to introduce a selection of concepts in a simplified form that are further described below in the Detailed Description. This Summary is not intended to identify key or essential features of the claimed subject matter, nor is it intended to be used as an aid in determining the scope of the claimed subject matter. The term "techniques," for instance, may refer to system(s), method(s), computer-readable instructions, module(s), algorithms, hardware logic, and/or operation(s) as permitted by the context described above and throughout the document.

BRIEF DESCRIPTION OF THE DRAWINGS

The Detailed Description is described with reference to the accompanying figures. In the figures, the left-most digit(s) of a reference number identifies the figure in which the reference number first appears. The same reference numbers in different figures indicate similar or identical items. References made to individual items of a plurality of items can use a reference number with a letter of a sequence of letters to refer to each individual item. Generic references to the items may use the specific reference number without the sequence of letters.

DETAILED DESCRIPTION

Figure 1:
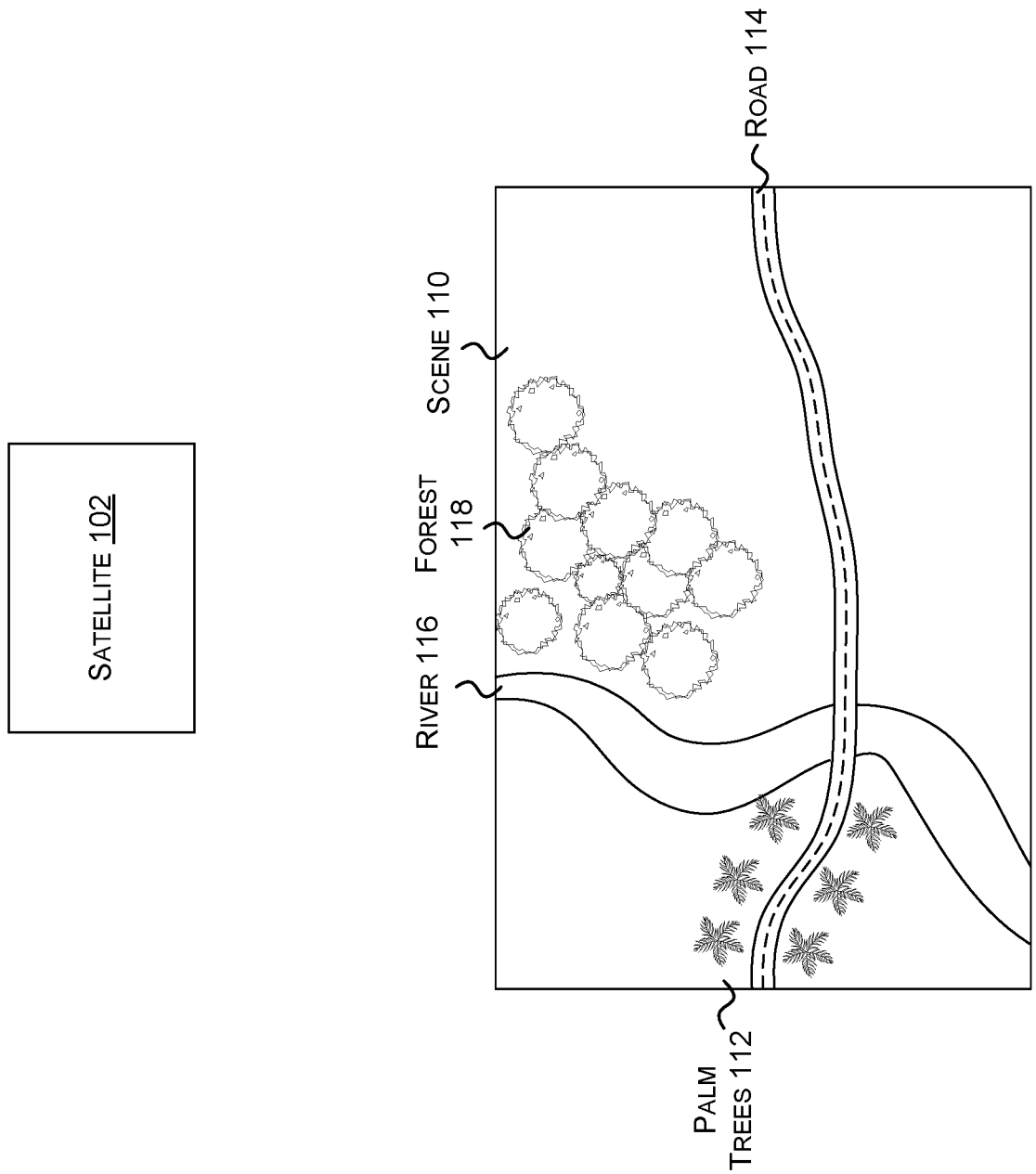
FIG. 1 illustrates a satellite over a piece of land.

FIG. 1 illustrates a satellite over a piece of land. Satellite 102 may be any type of image capturing object that is high enough in the sky to have clouds interfere with the location being photographed. Scene 110 is a location that satellite 102 may take one or more images of over a period of time. Scene 110 includes palm trees 112, road 114, river 116, and forest 118.

Figure 2:
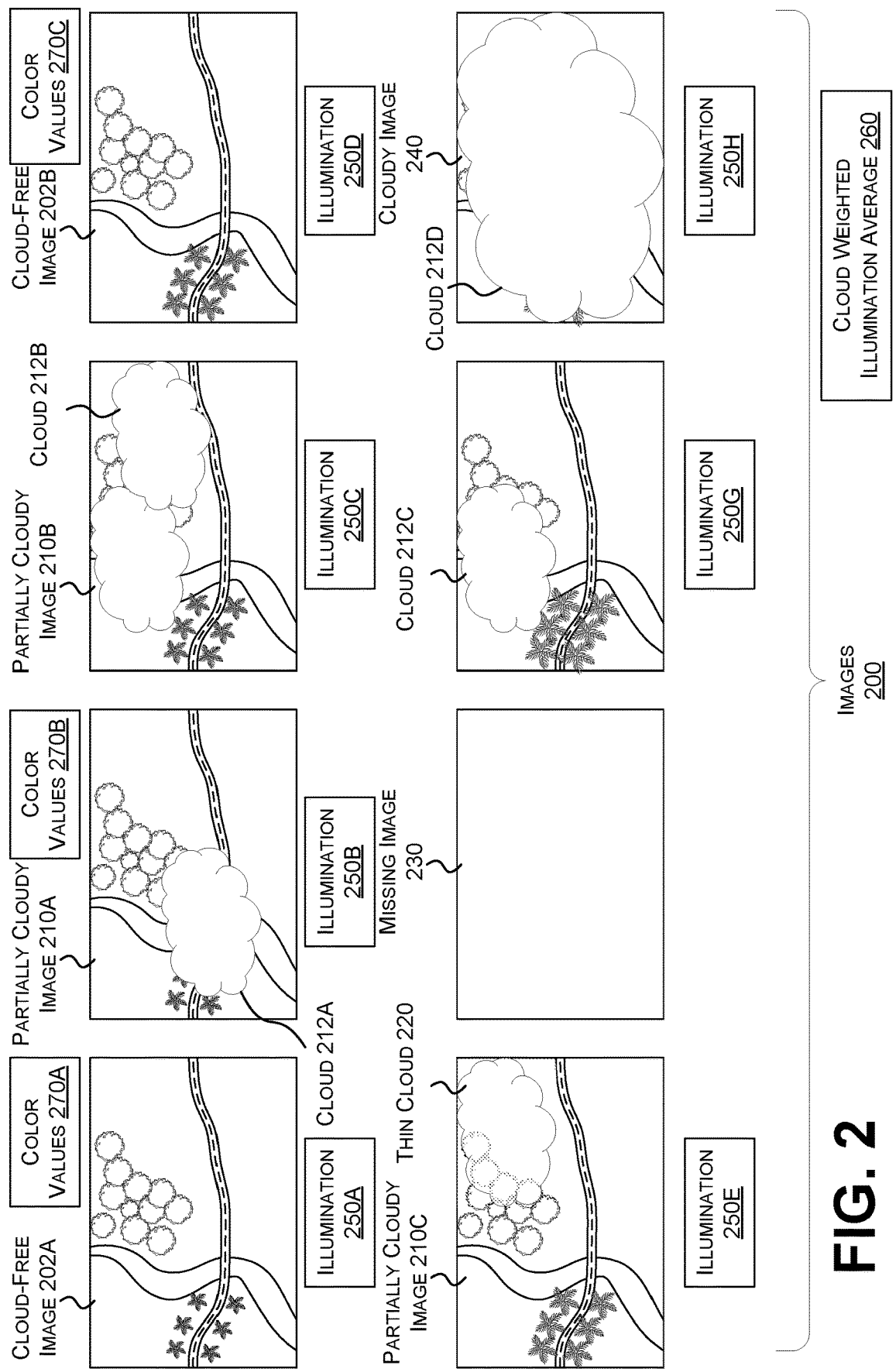
FIG. 2 illustrates a series of images of the piece of land captured by the satellite.

FIG. 2 illustrates a series of images of the piece of land captured by the satellite. In some configurations, an assumption is made that a sequence of images changes slowly from image to image. For example, when satellite images are taken daily for a period of weeks or months, the subjects of the image are expected to change slowly over this timeframe. For example, plants captured by the images may change color throughout the seasons.

In some configurations, changes to the color of a patch of land are interpolated, yielding a function that predicts a color of that patch of land for a given point in time. Colors are interpolated by fitting a line to the observed colors of the patch of land. A linear regression may be used to fit the line to the observed colors. For example, as the patch changes from green to dark green, a regression is fit to that change, yielding an equation that can predict a color of that patch when a cloud was obscuring it.

In some scenarios, multiple satellite images are taken of the same location over time. Some of the images may have been taken on a clear day. Other images may have been taken when the sky was partially cloudy or completely clouded over. And there may be days when no image was taken at all. Even though some of the images may have been taken on a clear day, days in which clouds obscured the location can interfere with the applications of satellite imagery.

Each image is a set of color values 270 for one or more spectral bands. Each image is associated with an illumination value 250, which may be computed with different techniques based on whether the image is determined to be cloud-free, partially cloudy, or cloudy. The series of images may be taken over a period of days or weeks.

As illustrated, the first image is cloud-free image 202A, followed by partially cloudy image 210A and extending to the right. Cloudy image 240 is the last image in the series. In some configurations, the images in the series of images are taken at regular intervals. Over the time in which the series of images was captures, palm trees 112 grew appreciably.

Cloud-free images 202 have few if any clouds. Partially cloudy images 210 have some cloud cover but also some cloud-free pixels. For example, cloud 212B partially obscures the forest 118. Partially cloudy image 210C has a thin cloud 220 that is translucent. Cloudy image 240 is mostly or entirely covered by clouds. Missing image 230 may be expected to exist based on a regular interval of images in the series of images.

FIG. 2 depicts one example of a series of images taken by a satellite. Any other number of images is similarly contemplated. For example, a time series of 48 satellite images taken over 48 days, all taken of the same location, may be processed to remove clouds from some or all of the images. The clouds are replaced in the images with a prediction of what the clouds were obscuring, e.g. trees, roads, farmland, etc. To do this, non-cloudy portions of other images in the series of satellite images are interpolated. Continuing the example, over 48 days, only slight changes to crop size, leaf color, and other similar changes are expected to be observed.

As referred to herein, interpolation refers to predicting what a location looked like at a particular point in time based on what it looked like at similar points of time and based on patterns in how the location is changing over time. For example, a green patch of grass may turn brown when it goes dormant during summer months. The dormant grass may then return to a green color in the fall. The color of the grass may be interpolated by fitting a line to the changes in color, and extrapolating an expected color of the grass from the line for a particular date.

Satellite imagery is three dimensional. In addition to height and width dimensions, each image is captured using a number of different spectral bands, each of which can be thought of as a color dimension. Each dimension of an image for a particular spectral band captures an intensity of light with a frequency within the spectral band. Illumination in this context refers to an intensity of light, e.g. an amount of light with the particular frequency. For example, a handheld camera typically measures light in three spectral bands—red, green, and blue. Satellite images may include 8 or more spectral bands including red, green blue, near infrared, shortwave infrared, ultra-violet, etc. Throughout this document, spectral bands may be identified with a color name, e.g. 'red', but in practice a spectral band is referred to by a spectral band index. For example, the 'red' spectral band may be referred to by the spectral band index '3'.

Satellite imagery may also be considered to have a fourth dimension—time—when a series of images are taken of the same patch of land. A series of satellite images are analyzed because some of the images will have been taken on a clear day such that the ground is visible. This data may be used to infer what the ground looked like on a cloudy day.

The four dimensional satellite image may be represented with a four dimensional tensor. Each element of the tensor represents an illumination of a particular spectrum band index, at a particular point in time, and at a particular (x, y) coordinate of the image. For example, if the fifth image has a 'red' illumination at coordinate (10, 20) of '24', then the tensor at time='5', spectral band index='3' (red), x='10', and y='20' would have the value '24'.

However, in some configurations, the four-dimensional tensor is represented as a two dimensional matrix $Y \in R^{CT \times HW}$. The first dimension CT combines the color dimension C (spectral band index) and the time dimension T, while the second dimension HW combines the height dimension H and width dimension W. For example, consider retrieving an illumination of spectral band index '3' ('red') from the fifth image at coordinate (10, 20). The index into the first of two dimensions of the matrix is computed by multiplying the spectral band index '3' ('red') by the time index '5'='15'. Similarly, the index into the second of two dimensions of the matrix is computed by multiplying the x dimension '10' and the y dimensions '20'='200'. If, as above, the illumination of the 'red' spectral band at (10, 20) of the fifth image is '24', then Y [15, 200] would be 24. One real-world example of the dimensions of C, T, H, and W are 10, 48, 500, and 500, respectively. This means that there are 10 color spectrums per image, where an image was taken every day for 48 days, and each image is 500 pixels tall by 500 pixels wide. In this case, CT=480, and HW=250,000, so Y is a 500×250,000 matrix of color intensity values.

When analyzing a series of images for changes to the ground, color changes over time for a particular coordinate. For example, a cornfield may exhibit a darkening green color throughout the growing season. With this in mind, the four dimensions of the tensor are reduced to the two dimensions of the matrix so that the tensor dimensions that change (color and time) are combined, while the tensor dimensions that don't change over time (x and y coordinates) are combined.

Direct temporal interpolation as a method to do cloud inpainting is very inefficient. For a 1000×1000 pixel image with 10 spectral bands across 100 days the direct interpolation would have to solve $10^7$ regression problems with dimension 100. Since the cloud-masks are potentially different for each pixel the problems become difficult to solve, and hard to run in parallel on a GPU. This leads us to instead do approximate interpolation through the following optimization:

$$F(X) = \|M \circ (X - Y)\|_F^2 + \alpha \sum_{t=1}^{T-1} \|X_{t+1} - X_t\|_F^2 \quad (1)$$

where $Y \in R^{CT \times HW}$ is the multispectral data captured by the satellite, $M \in R^{CT \times HW}$ is the data mask (0 for missing data and cloudy pixels, 1 for clear sky pixels), and $X \in R^{CT \times HW}$ is the desired cloud-free reconstruction that is interpolated from the other images in the series. Each of these matrices are two dimensional, with one dimension representing the possible combinations of color and time—i.e., each color spectrum for each index of the image in the series of images.

The other dimension represents an x,y coordinate within an image. Bolded letters, such as Y, M, and X therefore contain values for each pixel in each color spectrum dimension for each point in time when a satellite image was taken. The notation $X_t$ is used to refer to the smaller sub-matrices of size C×HW corresponding to the data at time t. The optimization problem embodied by equation (1) becomes the pixel-wise piecewise interpolation between cloud-free pixels as $\alpha \to 0^+$ (as alpha approaches zero) with the proviso that the extrapolation from the first and last cloud-free pixels is a constant. This problem is quadratic, but with the proposed size this is a problem in $10^9$ variables. It can also be formulated as $10^7$ quadratic problems in 100 variables.

Equation (1) may be minimized to determine an X that describes a series of images that accurately predict what would have been visible in a scene without clouds in the picture. Equation (1) is an example of damped interpolation for reconstructing satellite images. In the first part of equation (1), $\|M \circ (X-Y)\|_F^2$, M indicates, for each color spectrum at each time and at each x, y location, whether a pixel is of a cloudy sky or is missing data (0) or whether a pixel is cloud-free (1). Y is the measured intensity of each color spectrum for each pixel at each point in time. X are the colors in each spectrum for each pixel at each point in time in which clouds have been removed. The $\|\ \|_F^2$ operator computes the Frobenious norm—i.e., the square root of the sum of the squares of each element. Conceptually, minimizing the first part of equation (1) generates reconstruction X so that it is close to what was observed Y when it is not cloudy. Specifically, pixels that are deemed to be cloudy, for which there is no image data, have an M of 0, and so do not contribute to the minimization of (X−Y). Pixels which are determined to be cloud-free have an M of 1, and so that pixel at that time and in that color band contributes to the reconstruction of X.

The second part of equation (1), $\alpha \Sigma_{t=1}^{T-1} \|X_{t+1} - X_t\|_F^2$, sums the differences in color values from image to image along the series of t images. Minimizing the second part of equation (1) makes it so that pixels do not change color fast. $\alpha$ determines how fast pixels are allowed to change. $\alpha$ can also be thought of as determining the relative importance of minimizing the rate of color change of pixels compared to the first part of the equation—making sure the reconstruction X is close to what is observed Y when it is not cloudy.

Illumination plays a significant role in accurately reconstructing an occluded portion of a satellite image. Specifically, the Y values of equation (1) that were captured on a clear day will be much brighter than those taken when there are a lot of clouds. As such, the cloud-free portion of a cloudy image will be much darker than the same portion of an image that is cloud free. Seasons also affect illumination. In terms of equation (1), if the Y values of two images that are adjacent in time have a large difference, it will appear as if there has been a large change in the subject of the image, when in fact the change may primarily be due to differences in illumination. Without correcting for the change in color values due to illumination differences, equation (1) will inaccurately interpolate X to account for the illumination-based changes. Specifically, the first portion of equation (1) attempts to minimize the differences between X and Y, which causes the reconstruction to incorporate the illumination-based values. At the same time, the second part of equation (1) attempts to minimize the differences in X from frame to frame, which has the effect of interpolating the illumination affected color values into the reconstruction X. Equation (1) is minimized iteratively, allowing the convergence of X to Y in the first part of the equation while minimizing the change in X across time in the second part of the equation. For this reason, it is one object of the disclosed embodiments to remove the effects of illumination from Y before reconstructing images X by minimizing equation (1).

Removing the effect of illumination on an image is a challenging problem. One issue is determining whether a pixel is part of a cloud, not part of a cloud, or part of a semi-transparent cloud. One example of a semi-transparent cloud is a thin cloud where the ground is clearly visible through the cloud, but some noise in the observation is still caused by the cloud.

For each image in the series of satellite images, a normalized illumination value is used to adjust color values prior to interpolating what was occluded. If an image is cloud-free, then the normalized illumination is defined as a function of time and spectral band $-l_{ct}$:

$$l_{ct} = \frac{1}{HW} \sum_{ij} Y_{ctij}$$

that simply averages the illumination of all pixels. This means that each day can have a different illumination and that illumination can vary across the spectrum. For example, on the same day, the red spectrum may have a different illumination than an ultra-violet spectrum due to differences in how different wavelengths of light are affected by clouds.

Estimating illumination from an image that is at least partially cloudy is tricky, because you don't want to take into account the pixels that are actually part of a cloud, as these pixels are very bright due to the cloud. Another reason to not consider pixels that are part of cloud is that it is the clouds that we want to remove, and so we don't want information about a cloud that is going to be removed affect what is reconstructed in the cloud's place. As such, when an image is partially cloudy, illumination is computed based on pixels that are not cloudy 'C'.

Simply averaging over these non-cloudy images is not optimal, because the average illumination of one region of an image isn't going to be the average illumination for the whole image. For example, reflectivity of a particular pixel depends on what it represents. For instance, a pixel that is part of dark soil will have a lower illumination value than a pixel that is part of a road, which is more reflective. To account for these differences in illumination within an image, a relative illumination may be computed.

Relative illumination is computed by taking the ratio of the average illumination of cloud-free pixels in two different images:

$$r_{t_1} = \frac{\sum_{ij \in C} Y_{ct_1 ij}}{\sum_{ij \in C} T_{ct_0 ij}} \quad (2)$$

In equation (2), pixels that are not cloudy C represents pixels that are not cloudy in either image. In some configurations, relative illumination is computed relative to the image that is the most cloud-free. As such, for partially cloud-free images, normalized illumination $r_{t_1}$ is the average illumination of cloud-free pixels of the image taken at time $t_1$ relative to the corresponding cloud-free pixels of the most cloud-free image. Given a relative illumination $r_{t_1}$ at time t1 the illumination $l_{t_1} = r_{t_1} * l_{t_0}$.

If an image is completely cloudy, then equation (2) evaluates to 0/0, and so another technique for determining illumination is needed. In some configurations, illumination is interpolated from the illumination of images before and after it, as illustrated in equation (3). Equation (3) is similar to equation (1) in that it interpolates missing values from image to image. But instead of looking for pixels, equation (3) solves for illumination values. Equation (3) may be applied for each spectrum band:

$$\iota(x) = \sum_{t=1}^{T} w_t(x_t - l_t)^2 + \gamma \sum_{t=1}^{T-1} (x_{t+1} - x_t)^2 \qquad (3)$$

where $0 \leq w_t \leq 1$ is a weight representing how cloud-free image t is. If $w_t=1$, then an image is completely cloud free, and if $w_t=0$, then the image is completely cloudy. Equation (3) is also different in than equation (1) in that $w_t$ of equation (3) is a continuous measure of how cloud-free image t is, while M is a binary measure of whether a pixel is part of a cloud or not.

As in equation (1), the first portion of equation (3) seeks to minimize the differences between observed illumination values/and reconstructed illumination values x. Also as in equation (1), the second portion of equation (3) ensures that illumination of cloud-free pixels changes slowly over time, e.g., as a result of the change in seasons. For days without sufficient cloud-free data we set $w_t=l_t=0$ and let the estimated (reconstructed) illumination $x_t$ be determined through the temporal continuity term—i.e., the second portion of the equation that minimizes differences in adjacent values of x. We solve this quadratic equation directly as a matrix equation. Although, faster approaches can be taken the problem is sufficiently small that it is not necessary. To describe the solution define the forward difference matrix $D \in R^{T \times T}$ by $$D = \begin{pmatrix} -1 & 1 & 0 & \cdots & 0 & 0 \\ 0 & -1 & 1 & \cdots & 0 & 0 \\ 0 & 0 & -1 & \cdots & 0 & 0 \\ \vdots & \vdots & \vdots & \ddots & \vdots & \vdots \\ 0 & 0 & 0 & \cdots & -1 & 1 \\ 0 & 0 & 0 & \cdots & 0 & 0 \end{pmatrix} \qquad (4)$$

We will also need the weight matrix W=diag(w). The objective function can then be written $$l(x)=(x-1)^T W(x-1)+\gamma \|Dx\|_2^2,$$

Where 'l' is luminance.

We can then set the derivative to zero and solve to find the minimum occurs for $$x=(W+\gamma D^T D)^{-1} L \qquad (5)$$

Where $D^T$ is the transposition of D (make rows into columns), l is the $l_t$ values stacked as a vector, $\gamma$ is the $\gamma$ from equation (3) that determines how much the algorithm cares about changes in l over time, and W is the $w_t$ values stacked as a vector. Equation (3) can be solved practically with closed-form equation (5) because the number of variables is much smaller than in equation (1). Continuing the example in which there are 48 images in a time series, equation (3) has to invert a 48×48 matrix for each spectrum band. This can be solved in a reasonable amount of time, while inverting the (480*250,000)×(480*250,000) matrix of equation (1) cannot.

Once illumination values are computed for each spectral band of each image in the time series, the illumination values are used to adjust Y of equation (1). Specifically, each pixel in a particular spectral band and time (CT) of Y is divided by that band and time's illumination value $l_{ct}$.

In some configurations, pixels identified as cloud-free are in fact covered by a thin cloud that affects the color of the pixel. These pixels are part of a cloud, but they also reveal the ground beneath the cloud. It is difficult to identify these pixels, and to decide what to do with them. As such, these pixels may be identified and weighted differently than pixels that are clearly part of a cloud or clearly not part of a cloud.

M from equation (1) is the result of a complicated cloud detection system that doesn't actually give a zero or one, but gives a value that ranges from zero to one. These values that predict whether a pixel is part of a cloud on a scale of zero to one are also used to refine illumination values.

In this section we discuss weighing the pixel in a way that reflects how certain we are that the pixel is cloud-free. Let $C_{tij}$ be the cloud probability assigned from the cloud-detector to the pixel at location i,j at time t, and let $\tau$ be the threshold used to determine if a pixel is cloud-free or not. c tends towards zero as a pixel is less likely to be part of a cloud, and tends towards one as the pixel is more likely to be part of a cloud. We then assign the availability score $$a_{tij} = \left(\frac{\tau - c_{tij}}{1-\tau}\right)^\zeta \qquad (7)$$

at location p, time t. Here $\zeta$ is a parameter to control the cloud contrast. This is needed as the cloud-probabilities from the cloud-detector can be excessively over-confident, e.g., if the cloud-detector is a neural network. For example, a neural network based cloud-detector may tend to be very sure that a pixel is part of a cloud or very sure that a pixel is not part of a cloud. Equation (7) undoes this over-certainty by generating availability score a that is less certain. It also describes how likely a pixel is to be cloud-free, the opposite of how likely a pixel is to be cloudy. Specifically, unlike cloud probability c, which approaches one as it is more likely to be part of a cloud, availability a approaches 1 as it is more likely to not be part of a cloud.

Equation (7) raises a term to $\zeta$. Any value between zero and one that is raised to any value $\zeta$ will also be between zero and one. If $\zeta$ is greater than one, then equation (7) will make values close to zero even closer to zero. So if you're certain that a pixel is cloud-free you'll be even more certain that it is cloud-free when $\zeta$ is greater than one. And if you're not certain that a pixel is cloud-free, you'll be even less certain when $\zeta$ is greater than one. In other words, raising a value between 0 and 1 to a power greater than one returns a smaller value. However, when $\zeta$ is less than one, you will be less certain that a pixel is cloud-free and more certain that it is cloudy. Availability a has been determined to be more realistic than cloud probability c.

$\tau$ is a cloud probability threshold above which the cloud probability is assumed to be one (cloudy). Any cloud probability that is below the threshold $\tau$ is converted to an availability a. In some configurations, $\tau$ is a threshold used to compute M values. If a pixel for a particular spectral band, time, x, and y has a cloud probability c greater than $\tau$, then the corresponding value of M will be one, otherwise M will be zero.

The expanded cloud-free scoring tensor containing the channels is $A=\{a_{tij}M_{ctij}\}_{i,p}$. A is like M, except A takes any value from zero to one, while M is a discreet value zero or one. We multiply by the cloudmask M to ensure that no cloudy pixels that were manually entered are considered available. The weighted illumination is then computed by the weighted average of illumination values:

$$l_{ct} = \frac{\sum_{ij} A_{ctij} Y_{ctij}}{\sum_{ij} A_{ctij}} \quad (8)$$

For each pixel, the availability of that pixel is multiplied by the raw illumination of that pixel. Now, when computing the illumination value, instead of using binary values when averaging an illumination, we use A. If there is a thin cloud, the A value will be closer to zero than if the pixel were completely cloud-free. In this way, thin clouds still count towards the calculation of the illumination value, but not as much as completely cloud-free pixels. Equation (8) is how the anchor illumination is computed. Analogously the relative illumination becomes:

$$r_{t_1} = \frac{\sum_{ij \in C} A_{ct_1 ij} Y_{ct_1 ij} / \sum_{ij \in C} A_{ct_1 ij}}{\sum_{ij \in C} A_{ct_0 ij} Y_{ct_0 ij} / \sum_{ij \in C} A_{ct_0 ij}} \quad (9)$$

Furthermore, the interpolation weights $w_t$ are assigned according to the formula $w_t = 1/HW\Sigma_{ij} A_{ctij}$ so as to give higher weights to cloud-free data. Equation (9) corresponds to equation (2) above in that it computes a relative illumination. The relative illumination it generates may be converted to an illumination in the manner described above. By introducing availability scores A as weights, better illumination values are generated.

Cloud weighted probabilities may also be applied when interpolating X to reconstitute what lies beneath a cloud. Specifically, in order to inform the interpolation with the cloud probabilities we consider using the availability matrix A in place of the cloud-mask M in equation (1) yielding:

$$F(X) = \|A \circ (X - Y)\|_F^2 + \alpha \sum_{t=1}^{T-1} \|X_{t+1} - X_t\|_F^2 \quad (10)$$

Equation (10)

Introducing the companion matrix $\Delta = I_C \otimes D \in R^{TC \times TC}$ we can write this in the simpler form $$F(X) = \|A \circ (X-Y)\|_F^2 + \alpha \|\Delta X\|_F^2 \quad (11)$$

As mentioned in the introduction this quadratic equation cannot be solved directly due to the size of the problem.

With the help of the matrix $B_{(ct)(ij)} = \sqrt{1 - (A_{(ct)(ij)})^2}$ we introduce the auxiliary function:

$$Q(X,Z) = \|A \circ (X-Y)\|_F^2 + \|B \circ (X-Z)\|_F^2 + \alpha \|\Delta X\|_F^2$$

The auxilliary function satisfies $Q(X,Z) \geq F(X)$ and $Q(X,X) = F(X)$, thus the global minimum of Q coincides with the global minimum of F. We will now proceed to alternate computing the minimum over Z and X. The minimum over Z is attained for $Z=X$ (note that the values of Z when $B_{(ct)(ij)} = 0$ does not affect the objective function). In our case the matrix B is chosen in such a way that the minimum over X can be efficiently computed. Taking the derivative with respect to X yields $$\frac{\partial Q}{\partial X} = 2(A \circ A \circ (X - Y) + B \circ B(X - Z) + \alpha \Delta^T \Delta X)$$
$$= 2(X - A \circ A \circ Y - B \circ B \circ Z) + \alpha \Delta^T \Delta X$$

From which it readily follows that the minimum is attained for:

$$X = (I + \alpha \Delta^T \Delta)^{-1}(A \circ A \circ Y - B \circ B \circ Z) \quad (12)$$

It is worth mentioning here that $K = (I + \alpha \Delta^T \Delta)^{-1}$ is a fixed matrix and can be computed efficiently as $$K = I \otimes (I + DD^T)^{-1} \quad (13)$$

Combining the iterations over Z and X gives the simple iteration $$X \leftarrow K(A \circ A \circ Y - B \circ B \circ X) \quad (14)$$

Equation (14) may be executed iteratively and in parallel to find X. Using a GPU, results have been obtained in less than 1 second.

Figure 3:
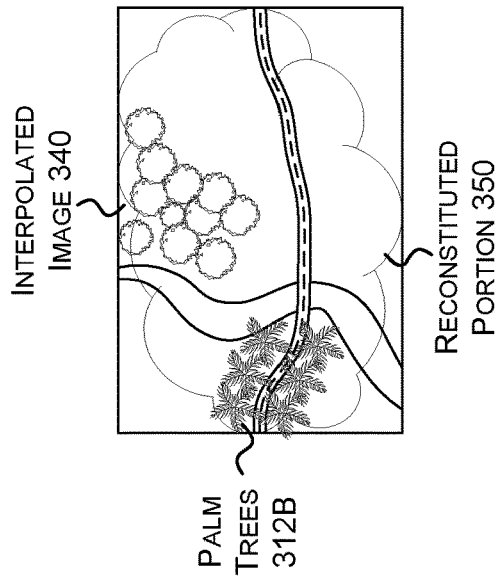
FIG. 3 illustrates images that were obscured by clouds after reconstruction.
Figure 3:
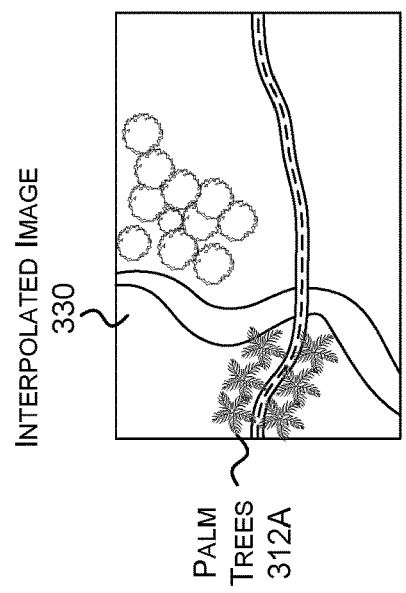

FIG. 3 illustrates predicted regions of images that were obscured by clouds. Interpolated image 330 is a reconstruction of missing image 230. Palm trees 312A are noticeably larger than when the series of images began in cloud-free image 202A. Similarly, interpolated image 340 is a reconstruction of cloudy image 240. Reconstituted portion 350 illustrates the portion of the original cloudy image 240 that has been reconstituted by interpolation. While not illustrated, partially cloudy images 210 may also have been reconstructed by replacing clouds 212 with the landscape the clouds obscured.

Figure 4:
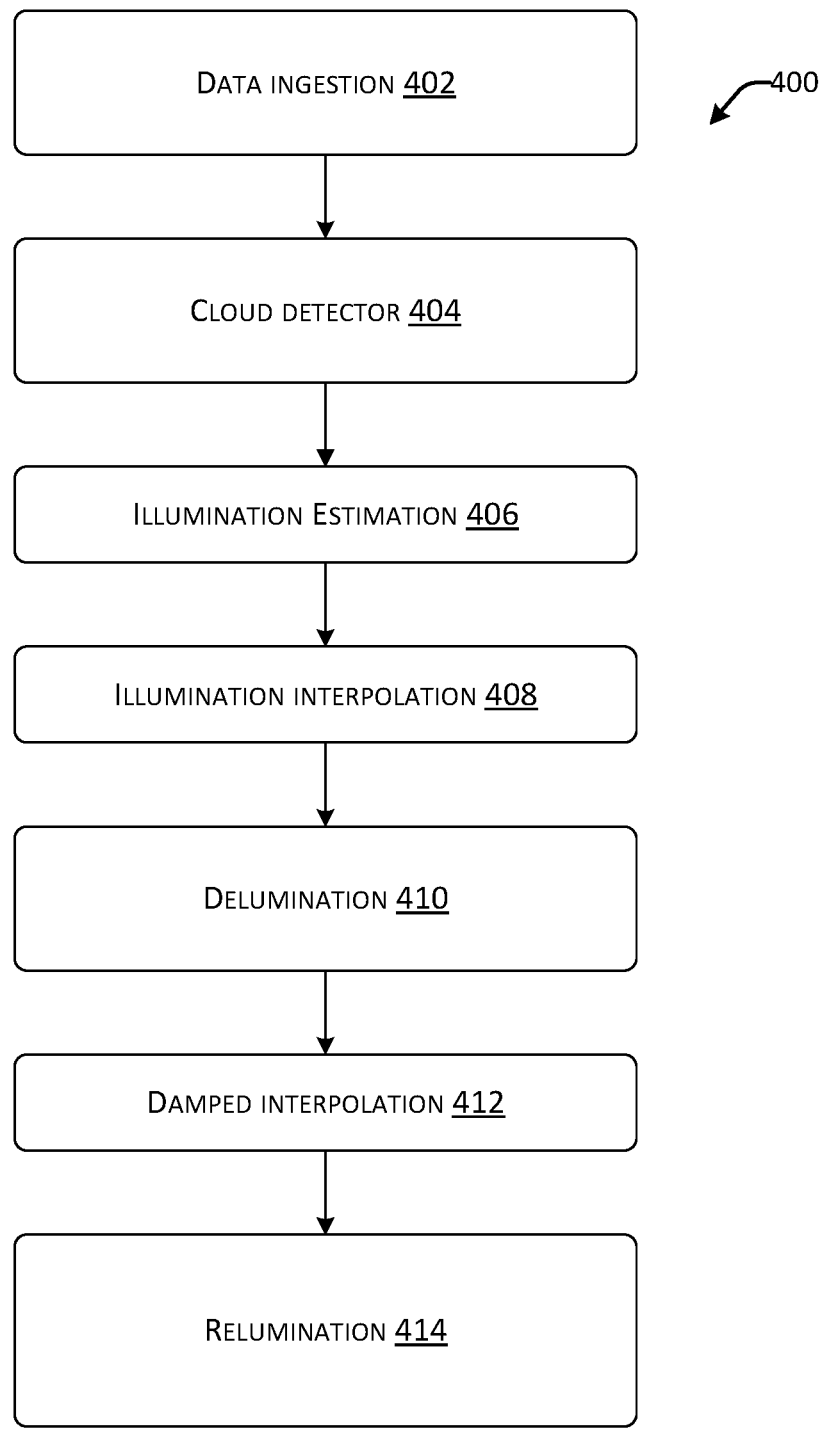
FIG. 4 is a flow diagram of an example method for cloud removal by illumination normalization and interpolation weighted by cloud probabilities.

Turning now to FIG. 4, aspects of a routine for reconstructing images that were partially or completely obscured by clouds is shown and described. For ease of understanding, the processes discussed in this disclosure are delineated as separate operations represented as independent blocks. However, these separately delineated operations should not be construed as necessarily order dependent in their performance. The order in which the process is described is not intended to be construed as a limitation, and any number of the described process blocks may be combined in any order to implement the process or an alternate process. Moreover, it is also possible that one or more of the provided operations is modified or omitted.

With reference to FIG. 4, routine 400 begins at operation 402, where satellite image data is ingested. The satellite image data may be a series of images of the same location, taken over a period of days, weeks, or months.

Next at operation 404, a cloud detector determines which pixels of the images in the series of images are part of a cloud, yielding a cloudiness value c.

Next at operation 406, the illumination of each image is estimated. Illumination values will be used to isolate changes in the scenery from changes in the illumination.

Next at operation 408, illumination interpolation is performed on any image that is completely cloudy.

Next at operation 410, delumination is performed, removing the illumination from predicted color values (Y of equation (1)).

Next at operation 412, damped interpolation is performed, e.g. equation (1) or (10) is minimized to find X that reconstitutes cloud-covered portions of the images.

Next at operation 414, relumination optionally restores the colors of the images to the raw values that satellite 102 actually captured.

The particular implementation of the technologies disclosed herein is a matter of choice dependent on the performance and other requirements of a computing device. Accordingly, the logical operations described herein are referred to variously as states, operations, structural devices, acts, or modules. These states, operations, structural devices, acts, and modules can be implemented in hardware, software, firmware, in special-purpose digital logic, and any combination thereof. It should be appreciated that more or fewer operations can be performed than shown in the figures and described herein. These operations can also be performed in a different order than those described herein.

It also should be understood that the illustrated methods can end at any time and need not be performed in their entireties. Some or all operations of the methods, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For example, the operations of the routine 400 are described herein as being implemented, at least in part, by modules running the features disclosed herein can be a dynamically linked library (DLL), a statically linked library, functionality produced by an application programing interface (API), a compiled program, an interpreted program, a script or any other executable set of instructions. Data can be stored in a data structure in one or more memory components. Data can be retrieved from the data structure by addressing links or references to the data structure.

Although the following illustration refers to the components of the figures, it should be appreciated that the operations of the routine 400 may be also implemented in many other ways. For example, the routine 400 may be implemented, at least in part, by a processor of another remote computer or a local circuit. In addition, one or more of the operations of the routine 400 may alternatively or additionally be implemented, at least in part, by a chipset working alone or in conjunction with other software modules. In the example described below, one or more modules of a computing system can receive and/or process the data disclosed herein. Any service, circuit or application suitable for providing the techniques disclosed herein can be used in operations described herein.

Figure 5:
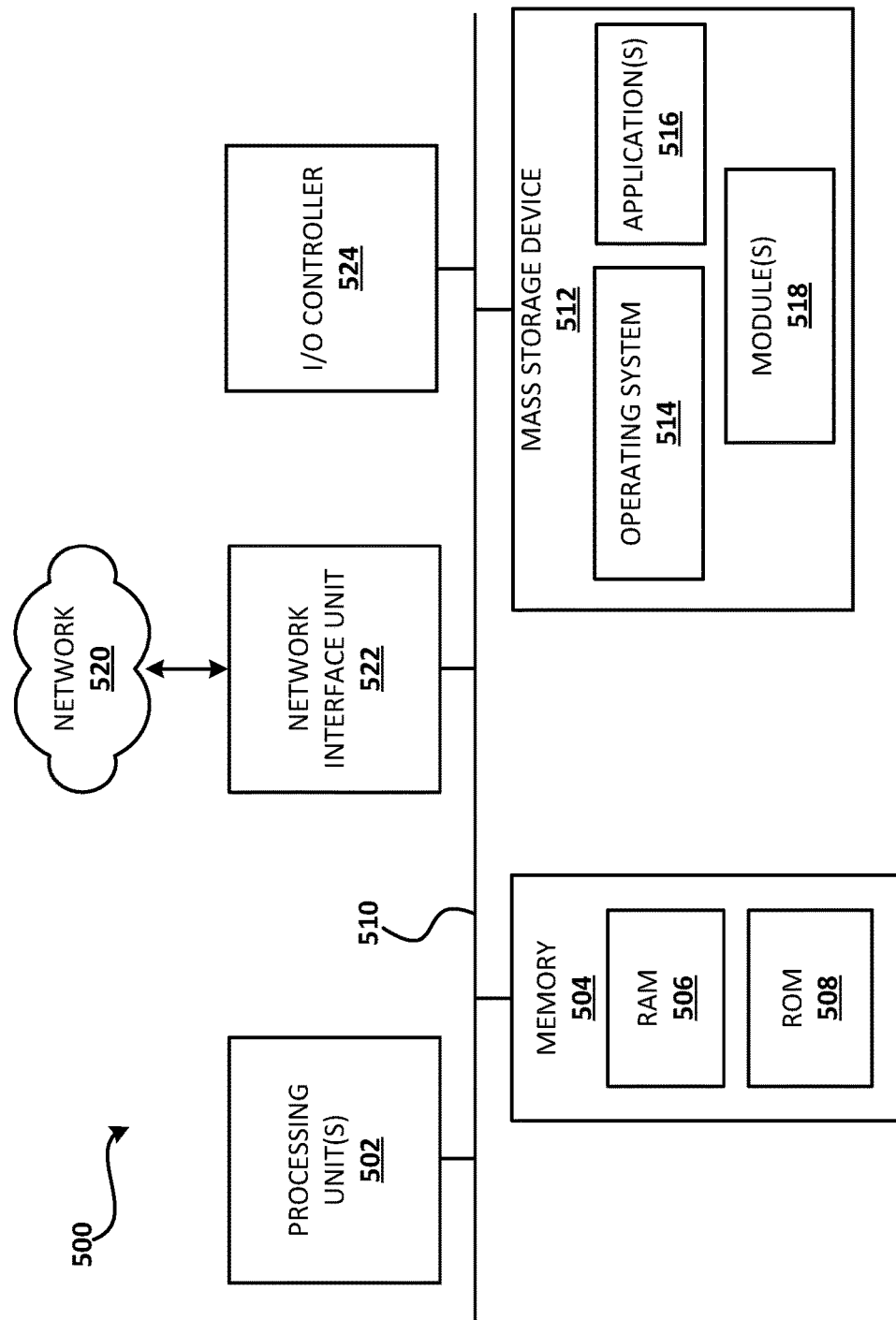
FIG. 5 is a computer architecture diagram illustrating an illustrative computer hardware and software architecture for a computing system capable of implementing aspects of the techniques and technologies presented herein.

FIG. 5 shows additional details of an example computer architecture 500 for a device, such as a computer or a server configured as part of the systems described herein, capable of executing computer instructions (e.g., a module or a program component described herein). The computer architecture 500 illustrated in FIG. 5 includes processing unit(s) 502, a system memory 504, including a random-access memory 506 ("RAM") and a read-only memory ("ROM") 508, and a system bus 510 that couples the memory 504 to the processing unit(s) 502.

Processing unit(s), such as processing unit(s) 502, can represent, for example, a CPU-type processing unit, a GPU-type processing unit, a field-programmable gate array (FPGA), another class of digital signal processor (DSP), or other hardware logic components that may, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc.

A basic input/output system containing the basic routines that help to transfer information between elements within the computer architecture 500, such as during startup, is stored in the ROM 508. The computer architecture 500 further includes a mass storage device 512 for storing an operating system 514, application(s) 516, modules 518, and other data described herein.

The mass storage device 512 is connected to processing unit(s) 502 through a mass storage controller connected to the bus 510. The mass storage device 512 and its associated computer-readable media provide non-volatile storage for the computer architecture 500. Although the description of computer-readable media contained herein refers to a mass storage device, it should be appreciated by those skilled in the art that computer-readable media can be any available computer-readable storage media or communication media that can be accessed by the computer architecture 500.

Computer-readable media can include computer-readable storage media and/or communication media. Computer-readable storage media can include one or more of volatile memory, nonvolatile memory, and/or other persistent and/or auxiliary computer storage media, removable and non-removable computer storage media implemented in any method or technology for storage of information such as computer-readable instructions, data structures, program modules, or other data. Thus, computer storage media includes tangible and/or physical forms of media included in a device and/or hardware component that is part of a device or external to a device, including but not limited to random access memory (RAM), static random-access memory (SRAM), dynamic random-access memory (DRAM), phase change memory (PCM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In contrast to computer-readable storage media, communication media can embody computer-readable instructions, data structures, program modules, or other data in a modulated data signal, such as a carrier wave, or other transmission mechanism. As defined herein, computer storage media does not include communication media. That is, computer-readable storage media does not include communications media consisting solely of a modulated data signal, a carrier wave, or a propagated signal, per se.

According to various configurations, the computer architecture 500 may operate in a networked environment using logical connections to remote computers through the network 520. The computer architecture 500 may connect to the network 520 through a network interface unit 522 connected to the bus 510. The computer architecture 500 also may include an input/output controller 524 for receiving and processing input from a number of other devices, including a keyboard, mouse, touch, or electronic stylus or pen. Similarly, the input/output controller 524 may provide output to a display screen, a printer, or other type of output device.

It should be appreciated that the software components described herein may, when loaded into the processing unit(s) 502 and executed, transform the processing unit(s) 502 and the overall computer architecture 500 from a general-purpose computing system into a special-purpose computing system customized to facilitate the functionality presented herein. The processing unit(s) 502 may be constructed from any number of transistors or other discrete circuit elements, which may individually or collectively assume any number of states. More specifically, the processing unit(s) 502 may operate as a finite-state machine, in response to executable instructions contained within the software modules disclosed herein. These computer-executable instructions may transform the processing unit(s) 502 by specifying how the processing unit(s) 502 transition between states, thereby transforming the transistors or other discrete hardware elements constituting the processing unit(s) 502.

Figure 6:
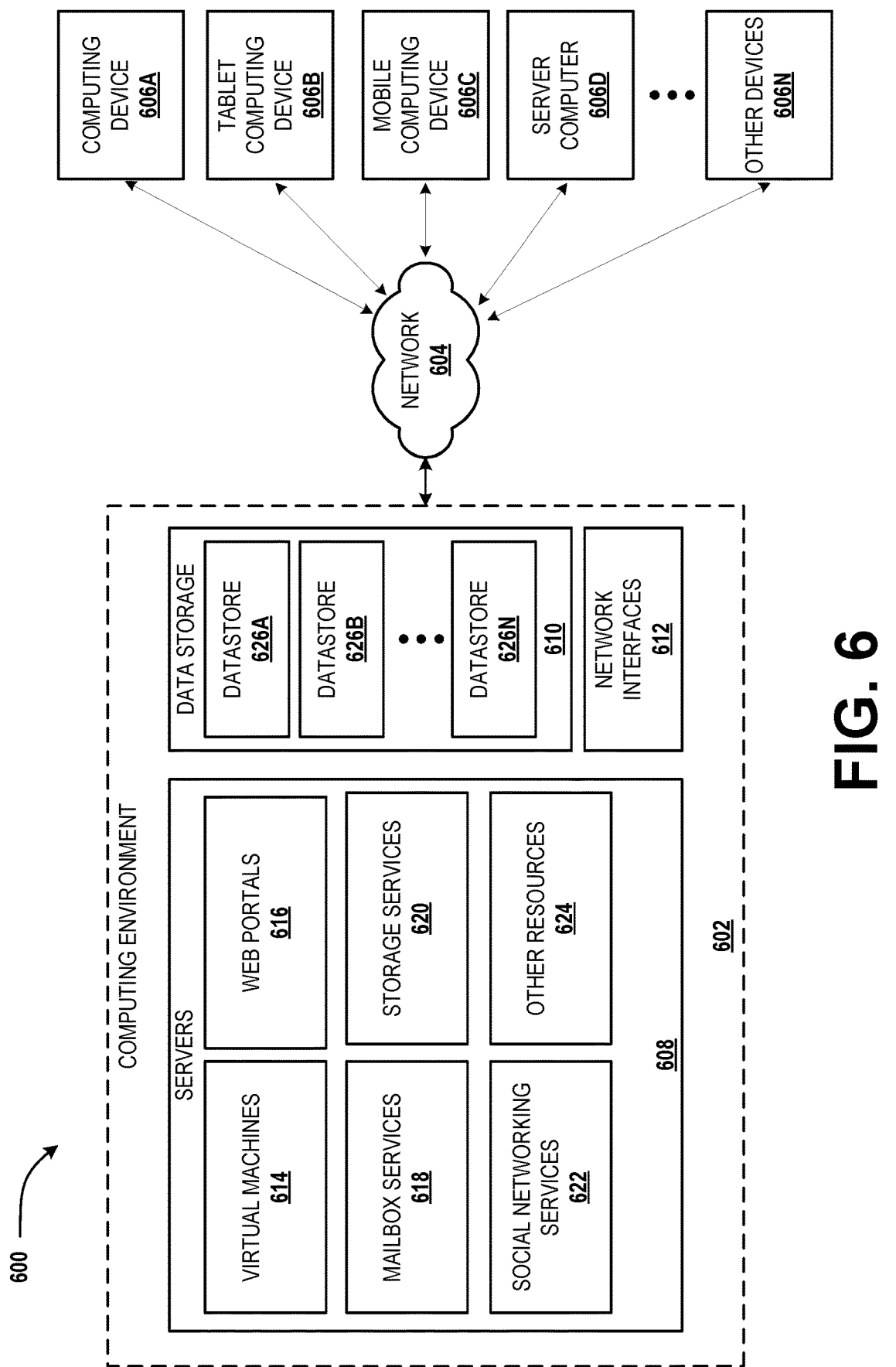
FIG. 6 is a diagram illustrating a distributed computing environment capable of implementing aspects of the techniques and technologies presented herein.

FIG. 6 depicts an illustrative distributed computing environment 600 capable of executing the software components described herein. Thus, the distributed computing environment 600 illustrated in FIG. 6 can be utilized to execute any aspects of the software components presented herein. For example, the distributed computing environment 600 can be utilized to execute aspects of the software components described herein.

Accordingly, the distributed computing environment 600 can include a computing environment 602 operating on, in communication with, or as part of the network 604. The network 604 can include various access networks. One or more client devices 606A-606N (hereinafter referred to collectively and/or generically as "clients 606" and also referred to herein as computing devices 606) can communicate with the computing environment 602 via the network 604. In one illustrated configuration, the clients 606 include a computing device 606A such as a laptop computer, a desktop computer, or other computing device; a slate or tablet computing device ("tablet computing device") 606B; a mobile computing device 606C such as a mobile telephone, a smart phone, or other mobile computing device; a server computer 606D; and/or other devices 606N. It should be understood that any number of clients 606 can communicate with the computing environment 602.

In various examples, the computing environment 602 includes servers 608, data storage 610, and one or more network interfaces 612. The servers 608 can host various services, virtual machines, portals, and/or other resources. In the illustrated configuration, the servers 608 host virtual machines 614, Web portals 616, mailbox services 618, storage services 620, and/or social networking services 622.

As shown in FIG. 6 the servers 608 also can host other services, applications, portals, and/or other resources ("other resources") 624.

As mentioned above, the computing environment 602 can include the data storage 610. According to various implementations, the functionality of the data storage 610 is provided by one or more databases operating on, or in communication with, the network 604. The functionality of the data storage 610 also can be provided by one or more servers configured to host data for the computing environment 602. The data storage 610 can include, host, or provide one or more real or virtual datastores 626A-626N (hereinafter referred to collectively and/or generically as "datastores 626"). The datastores 626 are configured to host data used or created by the servers 608 and/or other data. That is, the datastores 626 also can host or store web page documents, word documents, presentation documents, data structures, algorithms for execution by a recommendation engine, and/or other data utilized by any application program. Aspects of the datastores 626 may be associated with a service for storing files.

The computing environment 602 can communicate with, or be accessed by, the network interfaces 612. The network interfaces 612 can include various types of network hardware and software for supporting communications between two or more computing devices including, but not limited to, the computing devices and the servers. It should be appreciated that the network interfaces 612 also may be utilized to connect to other types of networks and/or computer systems.

It should be understood that the distributed computing environment 600 described herein can provide any aspects of the software elements described herein with any number of virtual computing resources and/or other distributed computing functionality that can be configured to execute any aspects of the software components disclosed herein. According to various implementations of the concepts and technologies disclosed herein, the distributed computing environment 600 provides the software functionality described herein as a service to the computing devices. It should be understood that the computing devices can include real or virtual machines including, but not limited to, server computers, web servers, personal computers, mobile computing devices, smart phones, and/or other devices. As such, various configurations of the concepts and technologies disclosed herein enable any device configured to access the distributed computing environment 600 to utilize the functionality described herein for providing the techniques disclosed herein, among other aspects.

The present disclosure is supplemented by the following example clauses.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

It should be appreciated that any reference to "first," "second," etc. elements within the Summary and/or Detailed Description is not intended to and should not be construed to necessarily correspond to any reference of "first," "second," etc. elements of the claims. Rather, any use of "first" and "second" within the Summary, Detailed Description, and/or claims may be used to distinguish between two different instances of the same element.

In closing, although the various techniques have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A method comprising:
   determining an illumination for each of a series of images captured by a satellite based on a cloud-weighted average of illumination values;
   modifying one or more color values of one of the series of images captured by the satellite to remove an effect of illumination;
   determining a portion of the one of the series of images is a cloud; and
   generating a prediction of what was occluded by the cloud in the portion of the one of the series of images based in part on the modified color values.

2. The method of claim 1, wherein the series of images captured by the satellite comprises a four-dimensional image, wherein the four dimensions include an X-coordinate, a Y-coordinate, a color spectrum index, and a time, wherein the four-dimensional image is stored as a two-dimensional matrix, wherein the first dimension of the two-dimensional matrix combines the color spectrum index and the time, and wherein the second dimension of the two-dimensional matrix combines the X-coordinate and the Y-coordinate.

3. The method of claim 2, wherein the prediction of what was occluded by the cloud is generated by minimizing differences between color values of the series of images and color values of corresponding predictions of the series of images.

4. The method of claim 3, wherein the differences are minimized by minimizing, for cloud-free pixels, a square root of a sum of squares of differences between actual color values of pixels of the series of images and corresponding color values of pixels of the predictions of the series of images.

5. The method of claim 2, wherein the prediction of what was occluded by the cloud is made by minimizing changes in color values of predictions of images that are adjacent in the series of images.

6. The method of claim 5, wherein the changes in color are minimized by minimizing a square root of a sum of squares of differences between color values of pixels of adjacent predictions of the series of images.

7. The method of claim 6, wherein a constant value multiplied by the minimized square root determines a relative importance of minimizing a rate of change in color values in the predictions of the series of images and a minimization of a difference between the color values in adjacent predictions of the series of images.

8. A computer-readable storage medium having computer-executable instructions stored thereupon which, when executed by a computing device, cause the computing device to:
   determine an illumination level for each of a series of images captured by a satellite based on a cloud-weighted average of illumination values;
   modify color values of one of the series of images captured by the satellite to remove an effect of illumination, wherein each pixel of each image in the series of images encodes a color value for a plurality of spectral bands, and wherein the illumination level comprises a per-spectral band illumination level;
   determine that a portion of the one of the series of images is part of a cloud; and
   generate a prediction of what was occluded by the cloud in the portion of the one of the series of images based in part on the modified color values.

9. The computer-readable storage medium of claim 8 wherein each per-spectral band illumination level of an individual cloud-free image is computed by averaging the color values of that spectral band of the individual cloud-free image.

10. The computer-readable storage medium of claim 8, wherein each per-spectral band illumination level of an individual partially-cloudy image is computed based on a relative illumination, wherein the relative illumination of an individual image of the series of images is computed by dividing an average illumination of cloud-free pixels in the individual image by an average illumination of cloud-free pixels in a most cloud-free image of the series of images.

11. The computer-readable storage medium of claim 10, wherein pixels at a particular coordinate are included in the relative illumination computation when neither image has a cloud at the particular coordinate.

12. The computer-readable storage medium of claim 8, wherein each per-spectral band illumination level of an individual cloudy image is interpolated from adjacent images in the series of images.

13. The computer-readable storage medium of claim 12, wherein each per-spectral band of illumination is inferred by minimizing a difference between inferred illumination and observed illumination and limiting a rate of change of illumination between images in the series of images.

14. The computer-readable storage medium of claim 8, wherein the effect of illumination is removed from the color values of the one of the series of images captured by the satellite by dividing color values of the one of the series of images by a corresponding illumination level.

15. A computing device, comprising:
   at least one processor; and
   a computer-readable storage medium having computer-executable instructions stored thereupon which, when executed by the at least one processor, cause the computing device to:
      determine an illumination level for each of a series of images captured by a satellite based on a cloud-weighted average of illumination values;
      modify one or more color values of one of the series of images captured by the satellite to remove an effect of illumination;
      determine that a portion of the one of the series of images is part of a cloud; and
      generate a prediction of what was occluded by the cloud in the portion of the one of the series of images based in part on the modified color values and based in part on availability scores that estimate a likelihood that each pixel of each of the plurality of images is cloud-free.

16. The computing device of claim 15, wherein a cloud-weighted average of illumination values are computed by multiplying a relative illumination of an image of the series of images by a base illumination.

17. The computing device of claim 15, wherein the availability scores are multiplied by a difference between a predicted color value and an observed color value when iteratively minimizing a function that yields predicted versions of the series of images.

18. The computing device of claim 15, wherein relative illumination values of each of the series of images are computed using availability scores that indicate how cloud-free a pixel is.

19. The computing device of claim 15, wherein the prediction of what was occluded by the cloud is based on a predicted image that is based on multiplying, for each pixel, an availability score of that pixel by a difference between a predicted color value and a measured color value for that pixel.

20. The computing device of claim 19, wherein the prediction of what was occluded by the cloud is additionally made by minimizing changes in predicted color values of images that are adjacent in the series of images.

\* \* \* \* \*